Feb. 16, 1965 H. HEUER 3,169,702

INPUT MEANS FOR INTRODUCING FUNCTION SIGNALS AND FUNCTIONAL INSTRUCTION SIGNALS TO A DATA PROCESSING MACHINE

Filed June 19, 1962 2 Sheets-Sheet 1

INVENTOR.
Hans Heuer

BY

Michael S. Striker
Atty

Feb. 16, 1965 H. HEUER 3,169,702

INPUT MEANS FOR INTRODUCING FUNCTION SIGNALS AND FUNCTIONAL INSTRUCTION SIGNALS TO A DATA PROCESSING MACHINE

Filed June 19, 1962 2 Sheets-Sheet 2

INVENTOR
Hans Heuer

BY

Michael S. Striker
Atty

United States Patent Office 3,169,702
Patented Feb. 16, 1965

3,169,702

INPUT MEANS FOR INTRODUCING FUNCTION SIGNALS AND FUNCTIONAL INSTRUCTION SIGNALS TO A DATA PROCESSING MACHINE

Hans Heuer, Wilhelmshafen, Germany, assignor to Olympia-Werke A.G., Wilhelmshafen, Germany Filed June 19, 1962, Ser. No. 203,624
Claims priority, application Germany, June 19, 1961, O 8,108
7 Claims. (Cl. 235—146)

The present invention refers to data processing machines and more particularly to such a machine which in direct decimal form or in a coded form e.g. as signals representing digital information or information comprising symbols or functional instructions for being further processed.

The other machine may furnish such signals either in direct decimal form or in a coded form e.g. as signals derived from a correspondingly perforated tape.

An arrangement of this type is described in great detail in my copending patent application Serial No. 848,321, filed October 23, 1959, now abandoned, and entitled "Intelligence Exchange Arrangement."

It is characteristic of the particular transmission system that the digit representing signals are preceded and followed by other signals representing symbols or functional instructions. For instance, the digit signals may be preceded by an "advance signal." Such a signal has only the purpose of indicating that the signals following it represent digits. In addition, the sole appearance of such an advance signal ahead of the digit signals constitutes an indication that other signals that will thereafter appear subsequent to the digit signals will represent instructions for one of the operations +, — or "no-calculation."

If, however, the advance signal appears simultaneously with either the signal + or with the signal —, then these combined signals preceding the digit signals constitute the instruction to form a "Total" or a "Subtotal," respectively. In this case, a signal + or — appearing thereafter following the digit signals is not an instruction for carrying out an operation but only an indication whether the respective total or subtotal is positive or negative.

In the arrangement according to my above-mentioned copending application, FIG. 2, the input of an advance signal energizes a relay which prepares the circuit for electromagnets controlling the input of the signals + and —. The input of the above-mentioned combined signals "Total" or "Subtotal" initiates in the machine the corresponding operations. In a similar manner, by the input of these siganls +, — or "no-calculation" following the input of the digit signals the energization of the corresponding relays in the receiving machine is effected.

The above-mentioned various relays control in accordance with the signals received certain operating or actuating electromagnets which cause the execution of the respective operations. In the arrangement according to the above-mentioned copending application the combination of the above mentioned relays with the also mentioned actuating electromagnets was necessary because the received signals would not carry enough energy to operate directly the comparatively powerful electromagnets.

It has been found desirable to improve and to simplify the input arrangement of data processing machines of the type described in the above-mentioned copending application, and particularly that portion of the input arrangement which deals not with digit representing signals but with other signals representing symbols and functional instructions.

It is therefore one object of this invention to provide in a data processing machine of the type set forth signal input means for said second group of signals composed of a smaller number of components and requiring less space.

It is another object of this invention to provide for an arrangement of this type which is of high efficiency and reliability.

It is still another object of this invention to provide for a signal input arrangement dealing with said second group of signals and cooperating with a conventional movable slide member controlling the processing of said second group of signals and forming a standard component of the machine.

With the above objects in view the invention includes in a data processing machine operable by first electrical actuation signals representing digits and by second actuation signals representing, respectively, different symbols or functional instructions, and having preferably only a single movable slide member controlling the processing of the second actuation signals a combination including a plurality of stop means which are each individually movable between an idle position and an operative position in which a portion thereof projects into the path of said single slide member to stop the movement of the latter in respectively different predetermined positions respectively associated with different ones of the second actuation signals. A plurality of control electromagnet means are provided for moving upon energization thereof the plurality of stop means, respectively, to the operative position thereof and a plurality of control relay means are respectively associated with said electromagnet means for selectively controlling when energized the energization thereof. A plurality of input means serve to receive a corresponding plurality of the second actuation signals and are respectively connected with corresponding ones of the plurality of the control relay means for applying the singals to, and for correspondingly energizing the latter. In addition, a special separate relay means responsive to a predetermined selected one of the second actuation signals and including two changeover contact means operable by energization of the separate relay means is arranged between two of the input means and two selected ones of the control relay means for interchanging the application of two selected ones of the second actuation signals between said selected ones of the control relay means, and a separate input means is provided for receiving said selected one of the second actuation signals and for applying it to the separate relay means for energizing the latter.

The highly advantageous result of the arrangement according to the invention is that even the weak signal currents are enabled to carry out in a reliable manner the input of said second group of actuation signals and to initiate those functions which the machine has to carry out in accordance with the transmitted functional instruction signals.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
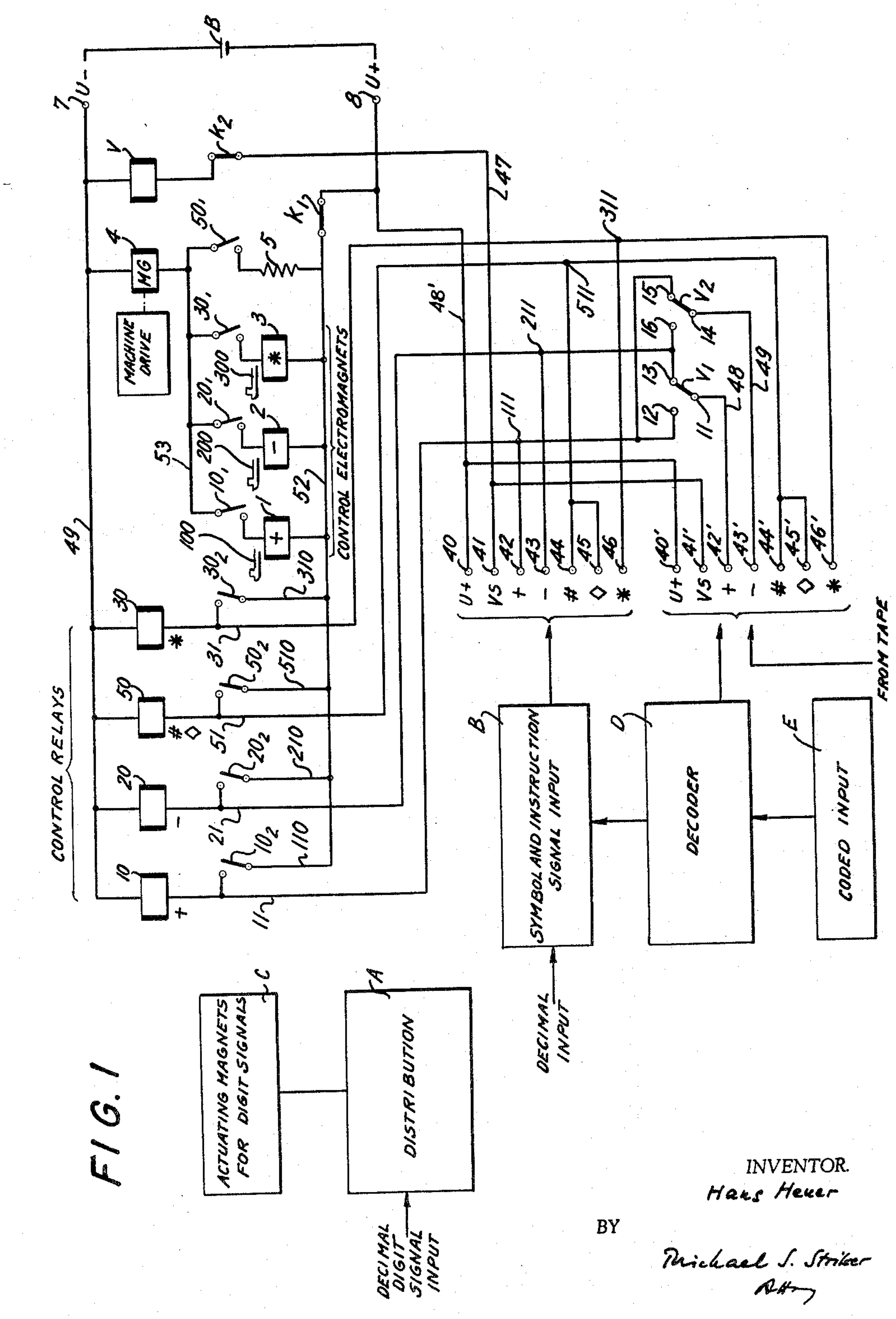
FIG. 1 is a schematic circuit diagram illustrating an embodiment of the invention.

In order to illustrate the relation between the present invention and the arrangement according to my above-mentioned copending application, FIG. 1 shows in block form certain component groups of the input arrangement, namely distribution means A having an input or decimal digit signals and which applies in proper distribution such signals to the actuating magnets for digit signals forming a group of magnets C. According to my prior application the block B would contain a similar distribution for the decimal input of symbol and instruction signals. If these signals are not available in decimal form but only in coded form then these signals would be furnished from the coded input E to a decoder D and supplied by the latter to the distribution B. However, according to the present invention the distribution in block B is eliminated and the decimal input of the second group of actuation signals is applied directly to the input terminals 40–46. The second set of input terminals 40′–46′ is provided for receiving the input of said second group of actuation signals in a particular code as conventionally used on perforated tapes as described further below. Of course, if the input signals are available only in a different code then the decoder D may be used for furnishing the signals in the required tape code to the second set of input terminals 40′–46′.

Figure 2:
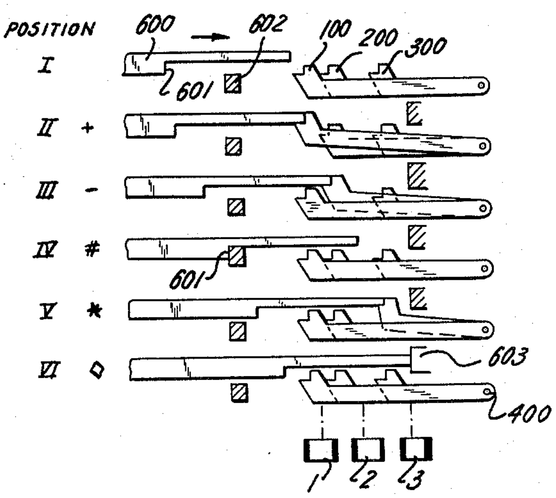
FIG. 2 is a diagrammatic cumulative illustration of various functional positions of certain cooperating members of the arrangement.

Before describing the circuitry according to FIG. 1 the mechanical portion of the arrangement as illustrated by FIG. 2 will be explained. As is well known a data processing machine conventionally comprises a function controlling movable slide member 600 which is movable in the course of the machine operation from a starting position I into a plurality of positions II–VI which are illustrated sequentially from top to bottom of FIG. 2. Each position is assigned to a different signal as indicated next to these positions in FIG. 2. Various means are provided in order to stop the slide member 600 in the different desired positions. Three stop levers 100, 200 and 300 are arranged to be lifted from their normal positions shown in the uppermost and in the lowermost portions of FIG. 2 in a turning movement about a common axle 400 by means of the respectively associated control electromagnets 1, 2 and 3. Each of the stop levers 100, 200 and 300 has a notched operative end which is adapted to engage and to stop the front end of the slide member 600 when the particular stop lever is lifted. It can be recognized easily from FIG. 2 that when the slide member 600 is to be stopped in position II the stop lever 100 is to be lifted. When the slide member 600 is to be stopped in position III the stop lever 200 is to be lifted. When the slide member 600 is to be stopped in position IV none of the stop levers is to be lifted but the slide member 600 is moved downwardly in a conventional manner so that a shoulder 601 thereof abuts against a stop 602 adjustable in conventional manner by the pin carriage of the machine. If the slide member 600 is to be stopped in position V then the stop lever 300 has to be lifted. Finally, when the slide member 600 is to be stopped in position VI, none of the stop levers is to be lifted but the member 600 is permitted to move forward until its forward tip abuts against a solid stop 603 also forming part of the machine.

Returning now to FIG. 1 the control magnets 1, 2 and 3 are shown and adjacent thereto diagrammatically the respectively associated stop lever 100, 200 and 300. The control magnet 1 is assigned to the signal +, the control magnet 2 is assigned to the signal —, and the control magnet 3 is assigned to the signal * meaning "Total."

The control magnets 1, 2 and 3 are connected in parallel with each other between the lines 52 and 53. The line 52 is connected via a normally closed control contact $k_1$ with a line 48 which leads to a terminal 8 where positive potential U + from a source B is available. The line 53 is connected across an electromagnet 4 with a line 49 which leads to a terminal 7 where the negative potential U — from the source B is available. The energization of each of the control magnets 1, 2 and 3 is controllable by a relay contact $10_1$, $20_1$, and $30_1$, respectively, interposed between the respective magnets and the line 53. For reasons explained further below a resistor 5 is connected in parallel with the control magnets 1, 2 and 3 between the lines 52 and 53 and current through this resistor is permitted to flow only when a corresponding relay contact $50_1$ is closed.

Four control relays are provided having relay coils, 10, 20, 30 and 50, respectively, of which coil 10 operates relay contacts $10_1$ and $10_2$, coil 20 operates relay contacts $20_1$ and $20_2$, coil 30 operates relay contacts $30_1$ and $30_2$ and coil 50 operates relay contacts $50_1$ and $50_2$. On one side the relay coils 10, 20, 30 and 50 are connected in parallel with the above-mentioned line 49 carrying negative potential. The other ends of the coils 10, 20, 30 and 50 are connected with the above-mentioned input terminals 40–46 and 40′–46′ as will be described now.

Relay coil 10 is connected by a line 11 with the input terminal 42 assigned to the signal +. The relay coil 20 is connected via line 21 with input terminal 43 assigned to the signal —. The relay coil 50 is connected via line 51 with the input terminal 44 assigned to the signal "no-calculation" and also with the terminal 45 assigned to the signal "Subtotal." Finally, the relay coil 30 is connected by line 31 with the input terminal 46 assigned to the signal "Total."

As can be seen the relay contacts $10_2$, $20_2$, $50_2$ and $30_2$ are connected by lines 110, 210, 510 and 310, respectively, with the above-mentioned line 52 carrying positive potential so that these relay contacts serve to hold the respective relay coil in energized condition after it has been energized, until the control contact $k_1$ is moved to open condition as will be explained later.

The terminal 40 is connected directly by the line 48′ with terminal 8 so as to carry also the positive potential U +.

The input terminal 41 assigned to an advance signal VS is connected by a line 47 via a normally closed control contact $k_2$ with a further control relay coil V the other end of which is connected to line 49 and thereby with the negative terminal 7. It is evident that if signals are applied in decimal form to the terminals 41–46 the relay coils 10, 20, 30 and 50 will be energized accordingly. However, it is necessary to be able to energize these control relays also by means of input signals furnished for instance from the decorder D to the second set of input terminals 41′–46′. Therefore, the above-mentioned lines 11, 21, 51 and 31 are extended to connect the respective relay coils also with the input terminals 41′–46′, the extensions starting at the respective junction points 111, 211, 511 and 311. Contact 40′ is connected with line 48′. In a similar manner the input terminal 41′ for the advance signal VS is connected with the line 47. However, as far as the input terminals 42′ and 43′ assigned respectively to the signals + and —, are concerned, a special control arrangement is provided.

Associated with the above-mentioned relay coil V and operated thereby are two change-over relay contacts $v_1$ and $v_2$ movable about pivots 11 and 14, respectively, and movable from the normal position shown where they are in engagement with stationary contacts 13 and 15, respectively, to a second position in which they are in engagement with stationary contacts 12 and 16, respectively. The pivot 11 of the contact $v_1$ is connected by line 48 with the above-mentioned input terminal 42′ and the pivot 14 is connected by line 49 with the above mentioned input terminal 43′. The above-mentioned extension of the line 11 leads both to the stationary contacts 12 and 15, and the above-mentioned extension of line 21 leads both to the contacts 13 and 16.

Figure 3:
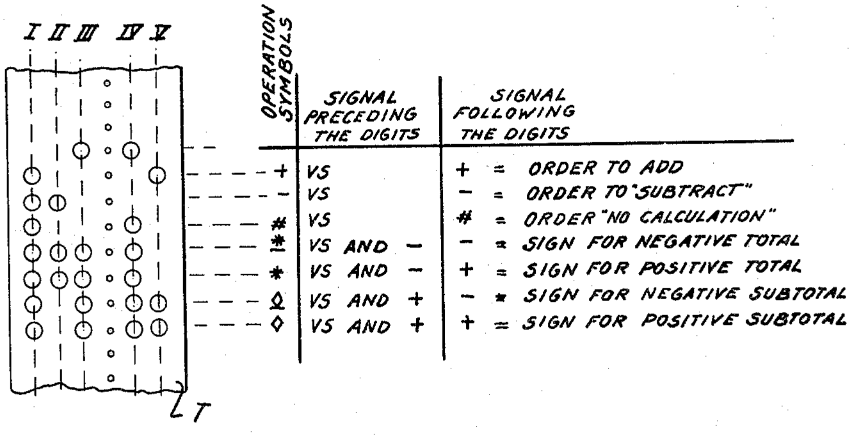
FIG. 3 is a diagrammatic chart explaining the correlation of certain signals and the corresponding functional instructions or symbols.

It may be assumed for the purpose of explanation of the above described arrangement that the symbol and instruction signals are derived from coded perforations in a tape through the decoder D or by some other means and applied selectively to the input terminals 41′–46′ assigned to the various individual signals of said second group thereof. In FIG. 3, by way of example a portion of a perforated tape T is shown which has perforations or holes arranged in five rows I–V. According to the code used in this case, one hole each in rows III, IV represents the advance signal VS. One hole each in rows I and V represents the signal + as indicated in the first column of the chart in FIG. 3. One hole each in rows I and II represents the signal —. One hole each in rows I and IV represents the signal "no-calculation." A combination of two signals, namely of the signal VS and the signal — appearing simultaneously as indicated by one hole each in the rows I, II, III and IV, represents the instruction "Total." Finally, a combination of the signal VS and the signal + as indicated by one hole each in rows I, III, IV and V, represents the instruction "Subtotal." The second column of FIG. 3 indicates the signals available for being introduced preceding the digit signals. If only the advance signal VS alone precedes the digit signals then this advance signal has only the meaning that the next following signals will be digit signals. If, however the signal preceding the digit signals is a combination of the advance signal VS and one of the signals representing + or — then this signal constitutes the instruction that the following digit signals are to be processed to form a total or a subtotal, respectively. The third column of FIG. 3 indicates the meaning of signals following the digit signals. In those cases where the advance signal VS has been introduced alone preceding the digit signals then the signal + following the digits will constitute either the order to add the digits represented by the just introduced digit signals to any other number or digit stored or recorded in the machine, the signal — will constitute the order to subtract the just-mentioned digit or digits from a previously stored or recorded digit or number and finally, the signal # represents the order "no-calculation" so that the previously introduced digit or digits will not be further processed. On the other hand if the signal introduced preceding the digit signals is one of the above-mentioned combination signals then the signal + appearing after the introduction of the digit signals will indicate that the respective total or subtotal is positive while the appearance of the signal — appearing after the digit signals will in this case only indicate that the respective total or subtotal is negative.

The above-described arrangement operates as follows: As can be seen from FIG. 1, the input of an advance signal VS at the input terminals 41′ causes energization of the relay coil V whereby the two relay contacts $v_1$ and $v_2$ are moved from their shown normal position to their second position in which they engage the contacts 12 and 16. Hereby, the input terminal 42′ assigned to the signal + is connected via line 48 and line 11 with the relay coil 10 assigned to the signal + while the input terminal 43′ assigned to the signal — is connected via line 49 and line 21 with the relay coil 20 which is also assigned to the signal —.

By way of example it may be assumed that a train of signals introduced from or delivered by the decoder D comprises an advance signal VS, a digit signal or signals and a following functional instruction signal, e.g. the signal —. The input of the signal VS causes as explained above, energization of the relay coil V and a change of position of the relay contacts $v_1$ and $v_2$. The relay coil V is maintained in energized condition by conventional means not shown until the normally closed control contact $k_2$ is moved to open position.

The signal — appearing after the introduction of the digit signals into units A and C is now applied from input terminal 43′ through line 49, contact $v_2$ and line 21 to the relay coil 20, so that the associated relay contacts $20_1$ and $20_2$ are moved to closed position. Contact $20_2$ keeps the coil 20 energized and contact $20_1$ causes energization of the control electromagnet 2 whereby the associated stop lever 200 is lifted into the position in which it is adapted to stop the slide member 600 in its position III assigned to the signal —. Simultaneously with the energization of the control electromagnet 2 also the electromagnet 4 is energized which causes the start of the machine drive to initiate the corresponding operation thereof, and to move the slide member 600 forward into the desired position III thereof.

In a conventional manner and by means not shown because they have nothing to do with the invention the normally closed control contacts $k_1$ and $k_2$ are moved to open position after the machine has carried out a certain portion of its operational cycle. Hereby, the relay coils V and 20 are deenergized and likewise the control electromagnet 2. In accordance with the position III of the slide member 600 a subtraction will be carried out by the machine.

If the signal appearing after the input of the digit signals had been the signal + appearing at the input terminal 41′ then a similar procedure would take place except that in this case the relay coil 10 and the control electromagnet 1 are energized so as to lift the stop lever 100 into its position causing the slide member 600 to reach its position II causing an adding operation.

In the further case that the input signal appearing after digit signals is the signal # appearing at the input terminal 44′ then the relay coil 50 is energized causing the relay contacts $50_1$ and $50_2$ to move to closed position whereby a current flow through the electromagnet 4 and through the resistor 5 is caused the resistance of which is approximately equivalent to that of the individual control electromagnets 1, 2 and 3. As can be seen in this case none of the stop levers 100, 200 or 300 is lifted and the slide member 600 will be stopped as explained above in its position IV. Under these conditions no calculation will be carried out after the input of the respective digit signals.

If a total or a subtotal is to be formed the corresponding command signals will be derived from those hole combinations in the tape T which represent these orders. These signals will be applied to the input terminals 46′ or 45′, respectively. The signal "Subtotal" applied to input terminal 45′ is transmitted via line 51 to the control relay coil 50 so that in the same manner as described above for the input signal "no-calculation" none of the stop levers 100, 200 and 300 will be lifted and the slide member 1 is free to be moved forward until it abuts against the stop 603 and thus assumes the position VI whereby the machine is caused to form a subtotal from the following digit signals. If, on the other hand, a signal "Total" is applied to the input terminal 46′ then this signal is transmitted via line 31 to the control relay coil 30 whereby the contacts $30_1$ and $30_2$ are moved to closed position and the control electromagnet 3 is energized. Hereby the stop lever 300 is lifted into the path of the slide member 1 so that the latter is stopped in its position V assigned to this order. Consequently the machine will carry out the formation of a subtotal.

In the case that a so-called "zero control" is to be carried out the following procedure takes place. It may be assumed that a "negative total" is to be formed first by application of the corresponding signal to the input terminal 46′. Also in this case, first the control relay coil 30 is energized and the corresponding "negative total" is formed by the machine. Afterwards the thus obtained subtotal result is again introduced without a preceding advance signal VS so that the relay V remains unenergized and the relay contacts $v_1$ and $v_2$ remain in their normal position. In this case, subsequent to the introduction of the digit signals a signal — is applied to the input terminal 43′. This signal is transmitted via line 49, contact $v_2$, contact 15 and line 11, to the control relay coil 10 with the result that the respectively associated stop lever 100 is lifted by the control electromagnet 1 into the path of the slide member 600 so that the latter is permitted to move into position II. Consequently, the previously formed total and the now introduced number are subtracted from each other so that the result of this subtraction is zero, provided that the thus processed numbers are identical.

It will be understood that each of the elements described above, or two or more together, may also find a useful application in other types of an input arrangement for a data processing machine differing from the type described above.

While the invention has been illustrated and described as embodied in an input arrangement for a data processing machine for the introduction of actuation signals representing symbols or functional instructions, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that from the standpoint of prior art fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a data processing machine operable by first electrical actuation signals representing digits and by second actuation signals representing, respectively, different symbols or functional instructions, and having a movable slide member controlling the processing of said second actuation signals, in combination, a plurality of stop means, each individually movable between an idle position and an operative position in which a portion thereof projects into the path of said slide member to stop the movement of the latter in respectively different predetermined positions respectively associated with different ones of said second actuation signals; a plurality of control electromagnet means for individually moving upon energization thereof said plurality of stop means, respectively, to the operative position thereof; a plurality of control relay means for selectively causing when energized the energization of said control electromagnet means, respectively; a plurality of input means for receiving each a different one of said second actuation signals and respectively connected with corresponding ones of said plurality of said control relay means, respectively, for applying said signals, respectively, to, and for correspondingly energizing the latter; a special separate relay means responsive to a predetermined selected one of said second actuation signals and including two change-over contact means operable by energization of said separate relay means and arranged between selected two of said input means and two selected ones of said control relay means for interchanging the application of two other selected ones of said second actuation signals between said selected two control relay means; and a separate input means for receiving said predetermined selected one of said second actuation signals and for applying it to said separate relay means for energizing the latter, so that, when either one of said two other selected ones of said second actuation signals is applied subsequent to application of said predetermined selected one thereof, then one of said other selected second actuation signals will reach the first one of said two selected control relay means, while the other one of said other two selected second actuation signals will reach the second one of said two selected control relay means, but when said predetermined selected second actuation signal has not been applied beforehand, then said one other selected second actuation signal will reach said second one of said two selected control relay means, and said other one of said other two selected control relay means, whereby zero-control can be carried out when desired.

2. In a data processing machine operable by first electrical actuation signals representing digits and by second actuation signals representing, respectively, different symbols or functional instructions, and having a movable slide member controlling the processing of said second actuation signals, in combination, a plurality of stop means, each individually movable between an idle position and an operative position in which a portion thereof projects into the path of said slide member to stop movement of the latter in respectively different predetermined positions respectively associated with different ones of said second actuation signals; a plurality of control electromagnet means for individually moving upon energization thereof said plurality of stop means, respectively, to the operative position thereof; a plurality of control relay means for selectively causing when energized the energization of said control electromagnet means, respectively; a plurality of input means for receiving each a different one of said second actuation signals and respectively connected with corresponding ones of said plurality of said control relay means, respectively, for applying said signals, respectively, to, and for correspondingly energizing the latter; a special separate relay means responsive to an advance signal constituting a selected one of said second actuation signals and including two change-over contact means operable by energization of said separate relay means and arranged between selected two of said input means and two selected ones of said control relay means for interchanging the application of two other selected ones of said second actuation signals between said selected two control relay means; and a separate input means for receiving said advance signal and for applying it to said separate relay means for energizing the latter, so that, when either one of said two other selected ones of said second actuation signals is applied subsequent to said advance signal, then one of said other selected second actuation signals will reach the first one of said two selected control relay means, while the other one of said other two selected record actuation signals will reach the second one of said two selected control relay means, but when said advance signal has not been applied beforehand then said one other selected second actuation signal will reach instead said second one of said two selected control relay means, and said other one of said other two selected actuation signals will reach said first selected control relay means, whereby zero control can be carried out when desired.

3. In a data processing machine operable by first electrical actuation signals representing digits and by second actuation signals representing, respectively, different symbols or functional instructions, and having a movable slide member controlling the processing of said second actuation signals, in combination, a first, a second and a third stop means, each individually movable between an idle position and an operative position in which a portion thereof projects into the path of said slide member to stop the movement of the latter in respectively different predetermined positions respectively associated with those of said second actuation signals which represent the instructions "plus," "minus" and "Total," respectively; a first, a second and a third control electromagnet means for individually moving upon energization thereof said first, second and third stop means, respectively, to the operative position thereof; a first, a second and a third control relay means for selectively causing when energized the energization of said first, second and third control electromagnet means, respectively; a first, a second and a third input means for receiving each a different one of said second actuation signals which represent the instructions "plus," "minus," and "Total," respectively, and respectively connected with corresponding ones of said first, second and third control relay means, respectively, for applying said signals, respectively, to, and for correspondingly energizing, the latter; a special separate relay means responsive to an advance signal constituting a selected one of said second actuation signals and including two changeover contact means operable by energization of said separate relay means and arranged between said first and second input means and said first and second control relay means for interchanging the application of those of said second actuation signals which represent the instructions "plus" and "minus," respectively to said selected first and second control relay means; and a separate input means for receiving said advance signal and for applying it to said separate relay means for energizing the latter, so that, when either one of said "plus" and "minus" representing actuation signals is applied subsequent to said advance signal, said "plus" representing actuation signal will be applied to said first control relay means and said "minus" representing actuation signal will be applied to said second control relay means, but when said advance signal has not been applied beforehand then said "plus" or "minus" representing actuation signals will be applied instead to said second or first control relay means, respectively.

4. In a data processing machine operable by first electrical actuation signals representing digits and by second actuation signals representing, respectively, different symbols or functional instructions, and having a movable slide member controlling the processing of said second actuation signals, in combination, a first, a second and a third stop means, each individually movable between an idle position and an operative position in which a portion thereof projects into the path of said slide member to stop movement of the latter in respectively different predetermined positions respectively associated with those of said second actuation signals which represent the instructions "plus," "minus" and "Total," respectively; a first, a second and a third control electromagnet means for individually moving upon energization thereof said first, second and third stop means, respectively, to the operative position thereof; a resistor means, connected in parallel with all of said control electromagnet means, a first, a second and a third control relay means for selectively causing when energized the energization of said first, second and third control electromagnet means, respectively, and a fourth control relay means for causing when energized a flow of current through said resistor means; a first, a second and a third input means for receiving each a different one of said second actuation signals which represent the instructions "plus," "minus" and "Total," respectively, and respectively connected with corresponding ones of said first, second and third control relay means, respectively, for applying said signals, respectively, to, and for correspondingly energizing, the latter, and fourth input means for receiving those of said signals representing the instructions "no calculation" and "Subtotal" and connected with said fourth control relay means for applying said last mentioned signals to, and for correspondingly energizing, said fourth control relay means; a special separate relay means responsive to an advance signal constituting a selected one of said second actuation signals and including two changeover contact means operable by energization of said separate relay means and arranged between said first and second input means and said first and second control relay means for interchanging the application of those of said second actuation signals which represent the instructions "plus" and "minus," respectively to said selected first and second control relay means; a further control electromagnet means for starting when energized an operational cycle of the data processing machine and connected in series with said parallel connected first, second and third control electromagnet means and resistor means for being energized whenever any one of said parallel connected means is energized; and a separate input means for receiving said advance signal and for applying it to said separate relay means for energizing the latter, so that, when either one of said "plus" and "minus" representing actuation signals is applied subsequent to said advance signal, said "plus" representing actuation signal will be applied to said first control relay means and said "minus" representing actuation signal will be applied to said second control relay means, but when said advance signal has not been applied beforehand then said "plus" or "minus" representing actuation signals will be applied instead to said second or first control relay means, respectively.

5. An arrangement as claimed in claim 4, wherein each of said first, second, third and fourth control relay means is provided with holding means for keeping an energized one of said control relay means in energized condition, and wherein a normally closed control contact means is connected in series with all of said holding means and with said control electromagnet means and with said resistor means, said normally closed control contact means being adapted to be moved to open position at the end of a predetermined portion of the operational cycle of the machine so as to interrupt thereupon the flow of current through all of said holding means, control relay means, control magnet means and said resistor means.

6. An arrangement as claimed in claim 5, including a second normally closed control contact means connected in circuit with said special separate relay means and adapted to be moved to open position simultaneously with said first mentioned control contact means so as to interrupt thereupon the flow of current through said separate relay means.

7. In a data processing machine operable by primary electrical actuation signals representing digits and by secondary actuation signals representing, respectively, different symbols or functional instructions, in combination, a single movable slide bar means controlling the processing of said second actuation signals; a plurality of stop means all of which cooperate with said single movable slide bar means, each of said stop means being individually movable between an idle position and an operative position in which a portion thereof projects into the path of said slide bar means to stop the movement of the latter in respectively different predetermined positions respectively associated with different ones of said second actuation signals; a plurality of control eelctromagnet means for individually moving upon energization thereof said plurality of stop means, respectively, to the operative position thereof; a plurality of control relay means for selectively causing when energized the energization of said control electromagnet means, respectively; a plurality of input means for receiving each a different one of said second actuation signals and respectively connected with corresponding ones of said plurality of said control relay means, respectively, for applying said signals, respectively, to, and for correspondingly energizing the latter; a special separate relay means responsive to a predetermined selected one of said second actuation signals and including two change-over contact means operable by energization of said separate relay means and arranged between selected two of said input means and two selected ones of said control relay means for interchanging the application of two other selected ones of said second actuation signals between said selected two control relay means; and a separate input means for receiving said predetermined selected one of said second actuation signals and for applying it to said separate relay means for energizing the latter, so that, when either one of said two other selected ones of said second actuation signals is applied subsequent to application of said predetermined selected one thereof, then one of said other selected second actuation signals will reach the first one of said two selected control relay means, while the other one of said other two selected second actuation signals will reach the second one of said two selected control relay means, but when said predetermined selected second actuation signal has not been applied beforehand, then said one other selected second actuation signal will reach said second one of said two selected control relay means, and said other one of said other two selected actuation signals will reach said first selected control relay means, whereby zero control can be carried out when desired.

References Cited by the Examiner

UNITED STATES PATENTS

| | | | |
|---|---|---|---|
| 1,895,095 | 1/33 | Connery et al. | 178—33 |
| 2,405,297 | 7/46 | Fitch | 178—27 |
| 3,063,625 | 11/62 | Bodnar et al. | 235—61 |

LEYLAND M. MARTIN, *Primary Examiner.*

NEIL C. READ, *Examiner.*